Jan. 7, 1941.
H. S. DROTNING ET AL
2,227,964
DOUBLE EXPOSURE PREVENTION DEVICE FOR CAMERAS
Filed Dec. 9, 1938     2 Sheets-Sheet 1
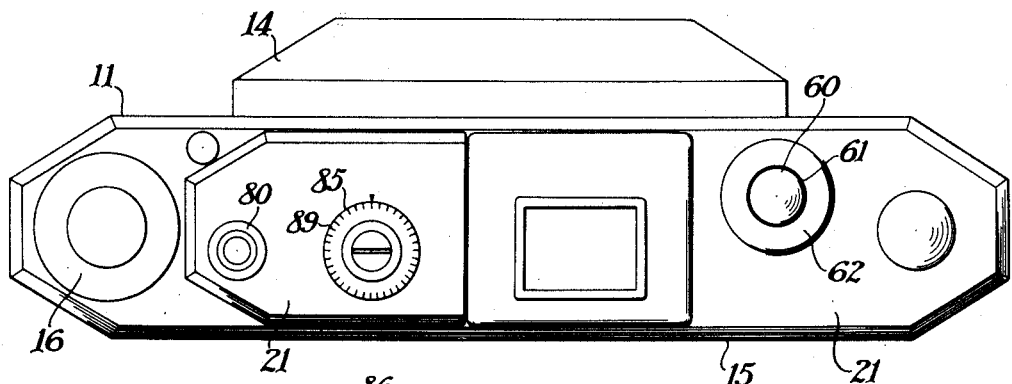
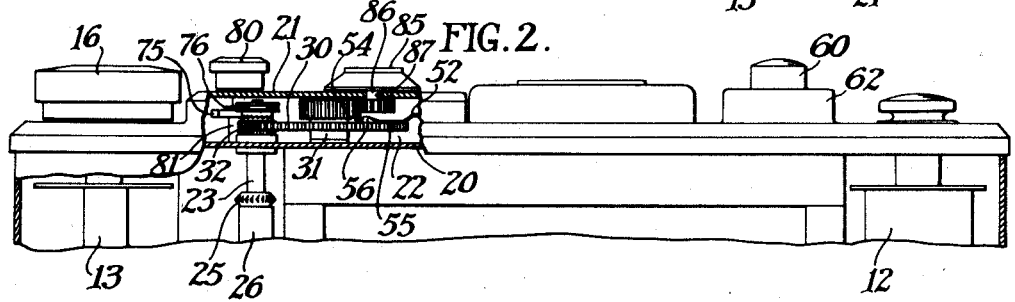
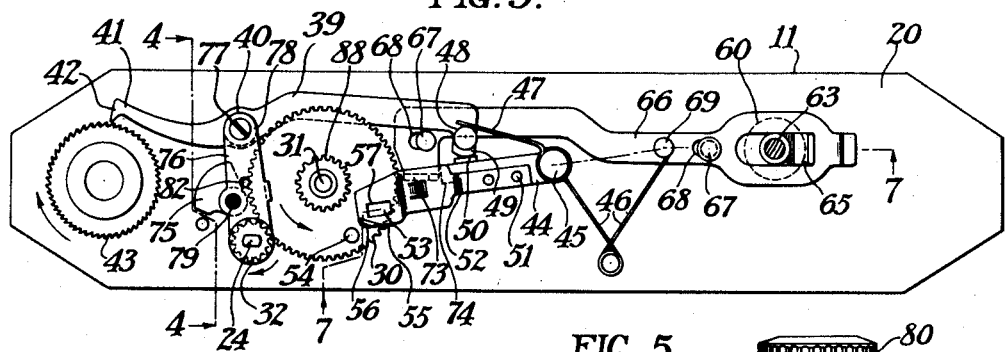
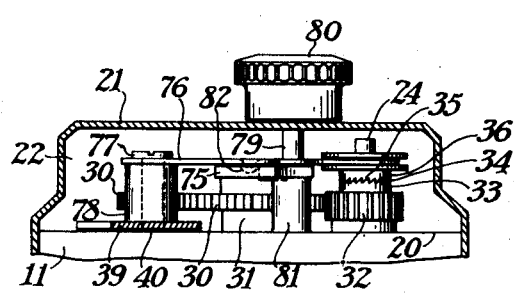
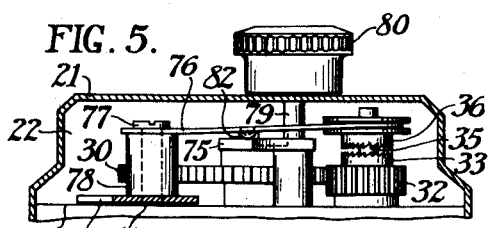
HENRY O. DROTNING
EDWARD KOSZALKA, JR.
INVENTORS
BY *[signatures]*
ATTORNEYS

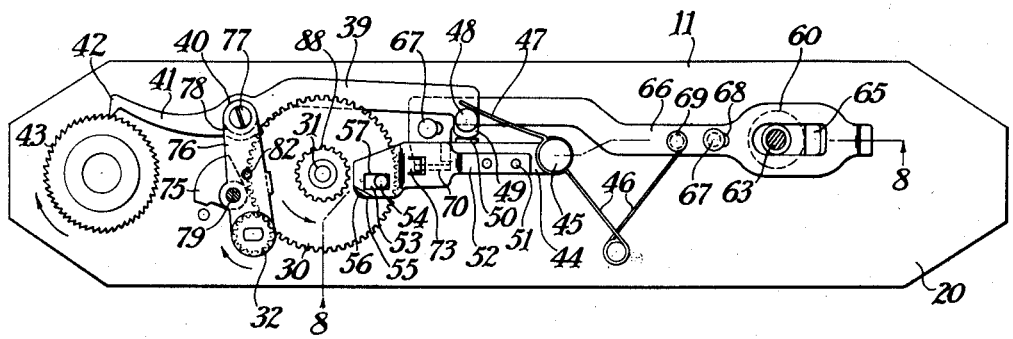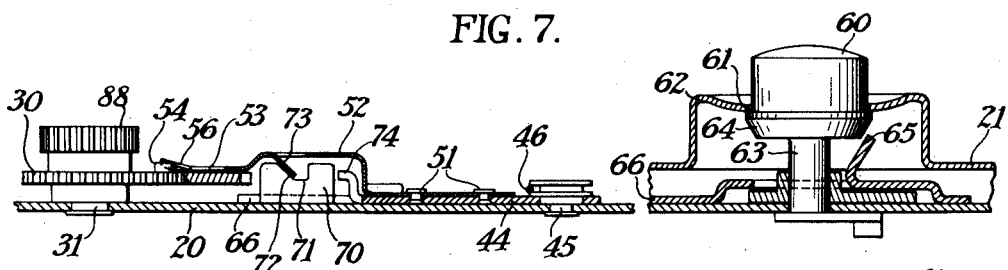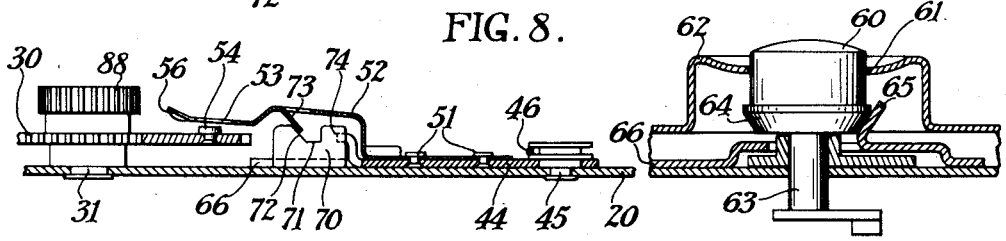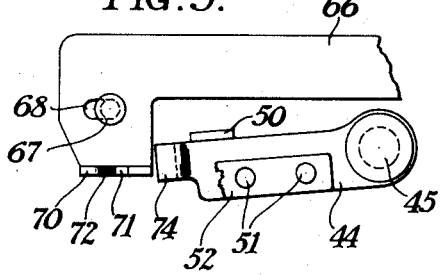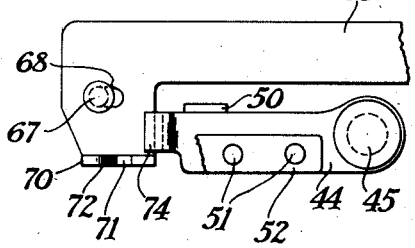

Patented Jan. 7, 1941

2,227,964

UNITED STATES PATENT OFFICE

2,227,964

DOUBLE EXPOSURE PREVENTION DEVICE FOR CAMERAS

Henry O. Drotning and Edward Koszalka, Jr., Rochester, N. Y., assignors to Eastman Kodak Company, Rochester, N. Y., a corporation of New Jersey Application December 9, 1938, Serial No. 244,822

10 Claims. (Cl. 95—31)

The present invention relates to cameras of the roll film type, and more particularly to an arrangement for automatically locking the take-up spool and preventing a double exposure on the same film area.

One object of the invention is the provision of an arrangement for automatically locking the winding mechanism to prevent further movement of the film strip when the latter has been advanced the distance of one image area.

Another object of the invention is the provision of an arrangement for preventing operation of the shutter until the winding mechanism has been locked, thus preventing the making of an exposure until an unexposed portion of the film has been moved into exposing position.

A further object of the invention is the provision of an arrangement for automatically locking the shutter against a second actuation until the film strip has been wound the proper distance.

A still further object of the invention is the provision of an arrangement for simultaneously releasing the winding mechanism, and locking the shutter actuating mechanism when the latter has been operated.

Yet another object of the invention is the provision of a device which is operated directly by the moving film strip and operatively connected to the winding and shutter operating mechanisms so as to automatically and accurately control these mechanisms in proper relation to the movement of the film strip.

And still another object of the invention is the provision of film winding and shutter control mechanisms which are simple and rugged in construction, automatic in their operation, and highly effective in use.

To these and other ends, the invention resides in certain improvements and combinations of parts all as will be hereinafter more fully described, the novel features being pointed out in the claims at the end of the specification.

In the drawings:

Fig 1 is a plan view of a roll film camera of the folding type which is provided with a double-exposure prevention device constructed in accordance with the present invention;

Fig. 2 is a front elevation view of a portion of the camera illustrated in Fig. 1, with a portion of the camera body cut away, showing the clutch arrangement for disengageably connecting the film measuring roll to the mechanisms which control the locking of the film winding knob and the shutter-trigger release button;

Fig. 3 is a view similar to Fig. 1, with the top plate removed, showing the arrangement of the parts of a double-exposure prevention device constructed in accordance with the preferred embodiment of the present invention;

Fig. 4 is a sectional view taken substantially on the line 4—4 of Fig. 2, but on a larger scale than the latter, showing the clutch in position to connect the measuring roll to the mechanisms for locking the film winding knob and the shutter release button;

Fig. 5 is a view similar to Fig. 4, but with the clutch in the disengaged position to disconnect the mechanisms from the film measuring roll;

Fig. 6 is a view similar to Fig. 3, but with the parts in position to positively lock the takeup roll against further rotation;

Fig. 7 is a vertical sectional view taken through the mechanism chamber substantially on the line 7—7 of Fig. 3, showing the relation of the parts when positioned as shown in Fig. 3;

Fig. 8 is a view similar to Fig. 7, but showing the relation of the various parts upon operation of the shutter-trigger release button;

Fig. 9 is a fragmentary view of a portion of the mechanism shown in Fig. 3, but on a larger scale than the latter, showing the arrangement for locking the shutter against a second actuation until the film has been moved; and Fig. 10 is a view similar to Fig. 9, showing the relation of the parts when the mechanisms are in the position illustrated in Fig. 6.

Similar reference numerals throughout the various views indicate the same parts.

The drawings show a roll film camera of the folding type which is formed to provide a body portion 11, of suitable shape and material in the opposite ends of which are positioned the film supply and takeup spools 12 and 13 respectively. The front of the camera is provided with a hinged bed 14 which, when closed, houses the camera bellows, shutter, and lens, not shown. The camera may be loaded with a roll of unexposed film by first removing the detachable back 15, as is well known to those in the art. The film is moved through the camera by means of a winding knob 16, which is operatively connected to the takeup spool 13. As the above mechanisms may be of any suitable or standard construction and do not constitute a part of the present invention, a detailed discussion thereof is not deemed necessary.

The top of the body 11 is provided with a pair of spaced plates 20 and 21 to form a hollow mechanism chamber 22 which houses the double-exposure prevention mechanism constructed in accordance with the present invention and to be later more fully described. A shaft 23 extends across the back of the camera and has one end 24 journaled in and projecting through the plate 20 and into the chamber 22, while the other end is journaled in the opposite camera wall, not shown. This shaft 23 has secured thereto, in any suitable and well-known manner, a pair of sharp toothed sprockets 25, only one of which is shown, which are arranged to be engaged by the opposite marginal edges of the film strip so that the movement of the latter will rotate or drive the shaft 23. Suitable springs or plates, not shown, may be utilized to hold the film strip in positive driving engagement with the sprockets 25. In order to prevent any sagging of the film strip between the sprockets 25, the shaft 23 is preferably provided with a sleeve 26 interposed between the sprockets 25, as best shown in Fig. 2. The shaft 23, with the sprockets 25, is thus positively driven solely by the movement of the film strip, and the lineal movement of the shaft is definitely related to the lineal movement of the film strip. For these reasons, the shaft 23 and the film engaging sprockets may be considered as a measuring roll which accurately measures the length of the film wound onto the takeup spool 13.

A large gear 30 is rotatably mounted on a stud 31 secured to the plate 20, and meshes with a smaller gear 32 loosely mounted on the end 24 of the shaft 23. This smaller gear is formed with an axially extending sleeve 33 the end of which is provided with a row of teeth 34 arranged to engage a similar row of teeth formed on the end of a sleeve 36 splined on the shaft 23. When the sleeves 33 and 36 are in the position shown in Fig. 4, the teeth 34 and 35 mesh to connect the gears 30 and 32 to the shaft 23. When, however, the teeth 34 and 35 are separated, as shown in Fig. 5 and to be later described, the gears 30 and 32 are disconnected from the shaft 23. The cooperating sleeves 33 and 36 with their inner-engaging teeth 34 and 35 thus provide a clutch for operatively connecting the gears 30 and 32 to and disconnecting the gears from the measuring roll shaft 23, as is apparent from inspection of Figs. 4 and 5. The purpose of this clutch connection will be later described.

By means of this arrangement, the gears 30 and 32 are positively driven from the shaft 23 which, in turn, is driven by the film strip so that the lineal movement of the gear 30 is in direct proportion to the lineal movement of the film strip. The various parts are so proportioned that the gear 30 will make one complete revolution when the film strip has been moved a distance of one image or exposure area. This movement of the gear 30 is then utilized to operate a mechanism, to be presently described, which automatically locks the takeup spool 13 against further rotation when the film strip has been moved the distance of one image area.

To secure this result, a lever 39 is pivotally mounted at 40 on the plate 20, and has the left end 41 thereof, as shown in Figs. 3 and 6, formed with a pawl 42 adapted to engage a ratchet 43 formed integral with or secured to the winding knob 16. It is apparent that when the lever 39 is moved in a counter-clockwise direction about its pivot 40, the pawl 42 will be moved to the position shown in Fig. 6 to engage and lock the winding knob against further rotation. In order that this locking of the winding knob 16 will occur in proper timed relation to the movement of the film strip, the lever 39 is operatively connected to and controlled by the gear 30.

The present embodiment of the invention secures this time control by means of an arm 44 which has one end thereof pivoted on the stud 45 secured to the plate 20. A hairpin spring 46 has an intermediate portion wrapped around the stud 45 the free end 47 thereof engaging stud 48 on the right end 49 of the lever 39 to resiliently hold the end 49 in engagement with a lug 50 on the arm 44 so that the latter will move as a unit with the lever 39, as is apparent. In order that the latter may be controlled by the gear 30, the arm 44 has secured thereto by rivets 51, or other suitable fastening means, a flexible member of leaf spring 52 the free end of which is formed with an opening 53 adapted to receive a laterally projecting pin 54 on the gear 30, as shown in Fig. 6. In order to permit the entry of the pin 54 in the opening 53, the leading edge 55 of the member 52 is bent up to form a cam 56. As the gear 30 rotates, the pin 54 engages the cam 56 to lift the member 52 until the pin registers with the opening 53, whereupon the member 52 snaps back into position to retain the pin in the opening, as shown in Fig. 6.

Further rotation of the gear 30 brings the pin 54 into engagement with an edge 57 of the opening 53 to move the arm 44 in a clockwise direction about its pivot 45, as viewed in Figs. 3 and 6. This movement of the arm 44 serves to pivot the lever 39 to move the pawl 42 into engagement with the ratchet 43 to stop further winding of the film. By means of this arrangement, the locking lever 39 is controlled from and by the gear 30 which in turn is controlled by the movement of the film strip. Thus the takeup spool is automatically locked against further rotation when the film strip has been moved the distance of one image area so as to move the exposed film out of exposed position and to simultaneously bring an unexposed portion of film into exposing position.

It is apparent from inspection of Figs. 3 and 6 that the positioned film portion may be wound onto the takeup spool by merely lifting the spring 52 out of engagement with the pin 54 so that the spring 46 may pivot the lever 39 and arm 44 to the position shown in Fig. 3 to move the pawl 42 out of engagement with the ratchet 43 to free the winding knob 15. It is preferred, however, to control the disengagement of the arm 44 from the gear 30 by means of the shutter-trigger release button 60 so that the positioned film cannot be moved until an exposure is first made, thus preventing inadvertent winding up of an unexposed section of the film. The actuation of the shutter then serves to unlock the windup knob 16.

The button 60 projects upwardly through an opening 61 formed in the raised portion 62 of the plate 21, as clearly shown in Figs. 7 and 8. This button is mounted on a stem 63 which is connected in any suitable manner to the shutter release so that upon depression of the button 60, as shown in Fig. 8, the shutter is actuated. As the connection between the button 60 and the camera shutter form no part of the present invention, a further description is not deemed necessary. The lower portion of the button 60 is formed with an inclined cam surface 64 which, when the button 60 is depressed as shown in Fig. 8, engages a similarly shaped cam 65 formed on the end of an L-shaped bar 66 which is slidably mounted on the plate 20 by means of studs 67 which project upwardly from the plate 20 and through slots 68 in the bar 66. The engagement of the cam 64 with the cam 65 serves to slide the bar 66 to the right, as viewed in Figs. 3 and 6. Upon release of the button 60, the latter moves out of engagement with the cam 65, as shown in Fig. 7, the bar 66 is then slid to the left, as viewed in Figs. 3 and 6, by means of the hairpin spring 46 the other end of which is secured to a lug 69 formed on the bar 66.

The opposite end of the bar 66 is formed with an upturned lug 70, the top edge of which is formed with a notch 71 having an inclined side 72, as shown in Figs. 7 and 8, to provide a cam. The notch 71 is positioned to receive an inclined depending tongue 73 formed from the material of the leaf spring 52, as shown in Fig. 7. When, however, the shutter actuating button 60 is depressed, the cam surface 64 thereof engages the cam 65, as shown in Fig. 8, to slide the bar 66 to the right, as viewed in Figs. 3, 6, 7, and 8. This movement of the bar 66 causes the inclined side 72 of the notch 71 to engage the depending tongue 73 to lift the member 52 out of engagement with the pin 54, as clearly shown in Fig. 8. In addition, this rightward movement of the bar 66 brings the lug 70 in the path of an extension portion 74 formed on the arm 44, as shown in Fig. 10, to prevent return movement of the arm 44 although the latter is disengaged from the gear 30.

When, however, the button 60 is released, the bar 66 is slid to the left, under the action of the spring 46, to move the lug 70 out of the path of the portion 74, as shown in Fig. 9. The bar 44 and lever 39 are now moved, under the action of the spring 46, from the position shown in Fig. 6 to the position shown in Fig. 3 to move the pawl 42 out of engagement with the ratchet 43 to release the winding knob 16, as is apparent.

As the winding knob is now free, it may be rotated to wind up the exposed portion of the film. As the film is wound, the shaft 23 is driven thereby to rotate the gears 30 and 32. When a new portion of the film has been properly positioned, the pin 54 then engages the spring member 52 to move the bar 44 and the lever 39 to again lock the winding knob. Thus each time a new portion of film is brought into position, the winding knob is automatically locked against further rotation, the advantages of which are obvious to those in the art. The subsequent operation of the shutter then serves to release the winding knob so that the film cannot be moved until it is first exposed, thus preventing the winding of an unexposed portion of the film and the wasting of said portion.

The present arrangement further provides an interlocking arrangement by which the shutter cannot be again actuated until the exposed film has been moved to bring an unexposed portion into position. Double exposures are thus simply and effectively prevented. It was pointed out above, that after the release of the button 60, the arm 44 and the lever 39 are returned to the position shown in Fig. 3. During this movement, the bar 66 also slides to the left so that the lug 70 and the portion 74 are now in the position shown in Fig. 9. The winding knob is now free. It is apparent from inspection of Fig. 9 that any attempt to now slide the bar 66 to the right by depressing the shutter actuating button 60, will merely bring the lug 70 into engagement with the portion 74, thus effectively preventing the sliding of the bar 66 and the depression of the shutter release button 60. By means of this simple yet highly effective arrangement, the shutter cannot be actuated a second time until the film is moved, thus preventing the making of a double exposure on a single film area. The above described mechanism thus provides an arrangement for not only preventing the accidental winding of an unexposed portion of the film, but also the elimination of double exposures.

When the film is initially threaded across the back of the camera and secured to the takeup spool 13, the above described mechanisms are preferably rendered inoperative. To secure this result, it is obvious that the mechanism must be disconnected from the measuring roll shaft 23. The above described sleeves 33 and 36 with their inner-engaging teeth 34 and 35 provide a simple arrangement for disconnecting or declutching the mechanism during the threading operation. To this end, the sleeve 36 is mounted, in any suitable manner, to the free end of a leaf spring 76 the other end of which is secured to a stud 77 which forms the pivot point for the lever 39, as shown in Figs. 3 and 6. In order to properly position the sleeve 36, a spacing member 78 surrounds the stud 77 and is interposed between the lever 29 and the leaf spring 76, as best shown in Figs. 4 and 5.

It is apparent from inspection of Figs. 4 and 5 that if the leaf spring 76 is lifted, the teeth 35 will be moved out of engagement with the teeth 34, as shown in Fig. 5, to disengage or declutch the gear 32, and hence the various mechanisms from the shaft 23. The leaf spring 76 may be lifted by means of a sector shaped member 75 secured to and movable as a unit with a stud 79 which is journaled in the plates 20 and 21. A finger knob 80 is secured to the stud 79 to operate the latter. The member 75 may be positioned on the stud 79 by means of a sleeve 81 surrounding the stud and interposed between the plate 20 and the member 75, as shown in Fig. 5. Movement of the stud 79, in a clockwise direction as viewed in Figs. 3 and 6, will bring the member 75 into engagement with a small nib or protuberance 82 formed on the under side of the leaf spring 76, as shown in Fig. 5. This engagement serves to lift the spring 76 and thus disengages the teeth 34 and 35 in a manner shown in Fig. 5. By means of this simple arrangement, the various mechanisms may be easily and quickly disengaged or declutched from the measuring roll shaft 23 during the threading operation.

As mentioned above, the gear 30 makes one complete revolution each time a new portion of film is moved into exposing position. Such revolutions may, therefore, be utilized to operate a counter, generally indicated by the numeral 85. The counter is mounted on a spindle 86 which carries a gear 87 meshing with a gear 88 mounted on the stud 31 which carries the large gear 30. The gear ratio of the gears 87 and 88 is such that gear 87 makes one and one-eighth (1⅛) revolutions for each revolution of the gear 88. Thus for eight exposures, the counter 85 will make a complete revolution to indicate that eight exposures have been made. A suitable indicating scale 89 may be formed on the counter 85. Obviously, the ratio of the gears 87 and 88 may be varied so that the counter 85 will make one revolution for more or less than eight exposures, as is apparent.

The above described invention thus provides an arrangement by which wastage of film is reduced by preventing the winding of unexposed film portions. In addition, double exposures on a single film area are effectively eliminated. Furthermore, the film winding mechanism is automatically locked when the proper amount of film has been wound, so that the task of proper registration is entirely removed from the camera user.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. In a roll film camera, the combination with a take-up spool positioned in one end of said camera, a winding knob operatively connected to said spool to rotate the latter to wind film thereon, a shutter-trigger release button mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, a pivoted arm controlled by said measuring roll for moving said lever into knob locking position, means connected to and operated by said button for moving said arm out of controlling position when said button is moved to shutter actuating position, and a portion on said arm adapted to be positioned in the path of said last mentioned means to prevent operation of said button until said arm has been positioned to move said lever into knob locking position.

2. In a roll film camera, the combination with a take-up spool positioned in one end of said camera, a winding knob operatively connected to said spool to rotate the latter to wind film thereon, a shutter-trigger release button mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, an arm pivoted on said camera and movable to engage the other end of said lever to move said one end into locking engagement with said knob, means controlled by said roll for connecting said arm thereto to move said lever into locking position in timed relation to the movement of said film, and means controlled by the actuation of said button for disconnecting said arm from said roll.

3. In a roll film camera, the combination with a take-up spool positioned in one end of said camera, a winding knob operatively connected to said spool to rotate the latter to wind film thereon, a shutter-trigger release button mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, an arm pivoted on said camera and movable to engage the other end of said lever to move said one end into locking engagement with said knob, means controlled by said roll for connecting said arm thereto to move said lever into locking position in timed relation to the movement of said film, means controlled by the actuation of said button for disconnecting said arm from said roll, and means on said arm normally positioned in the path of said last mentioned means to prevent operation of said button but movable out of blocking position when said lever has been moved into knob locking position so that said button may not be operated until the film has been moved.

4. In a roll film camera, the combination with a take-up spool positioned in one end of said camera, a winding knob operatively connected to said spool to rotate the latter to wind film thereon, a shutter-trigger release button mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, a gear mounted on said camera, means for connecting said gear to said roll, an arm pivotally mounted on said camera and movable to engage the other end of said lever to move said one end into locking engagement with said knob, means for connecting said arm to said gear, means on said gear for actuating said arm to move said lever into engagement with said knob in timed relation to the movement of said film, and means actuated and controlled by said button for disconnecting said arm from said gear when said button is moved to shutter operating position.

5. In a roll film camera, the combination with a take-up spool positioned in one end of said camera, a winding knob operatively connected to said spool to rotate the latter to wind film thereon, a shutter-trigger release button mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, a gear mount on said camera and operatively connected to said roll, an arm pivotally mounted on said camera and movable to engage the other end of said lever to move said one end into locking engagement with said knob, means for simultaneously connecting said arm to said gear and for actuating said arm to move said lever into locking position in timed relation to the movement of said film, and means actuated by said button when the latter is moved to shutter operating position to disengage said arm from said gear.

6. In a roll film camera, the combination with a take-up spool positioned in one end of said camera, a winding knob operatively connected to said spool to rotate the latter to wind film thereon, a shutter-trigger release bottom mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, a gear mounted on said camera and operatively connected to said roll, an arm pivotally mounted on said camera and movable to engage the other end of said lever to move said one end into locking engagement with said knob, means for simultaneously connecting said arm to said gear and for actuating said arm to move said lever into locking position in timed relation to the movement of said film means actuated by said button when the latter is moved to shutter operating position to disengage said arm from said gear, and means on said arm for preventing actuation of said button until said arm has been moved to bring said one end of said lever into knob locking position.

7. In a roll film camera, the combination with a take-up spool positioned in one end of said camera, a winding knob operatively connected to said spool to rotate the latter to wind film thereon, a shutter-trigger release button mounted on said camera, of a measuring roll engaged by said film and rotated by the movement thereof through said camera, a lever pivoted on said camera and having one end thereof movable into engagement with said knob to lock the latter against further rotation when a predetermined length of film has been wound onto said spool, a gear mounted on said camera and operatively connected to and controlled by said roll, a pin on said gear, an arm pivoted on said camera and movable to engage the other end of said lever to move said one end into locking engagement with said knob, said arm having an opening in the free end thereof adapted to receive said pin to provide a driving connection between said arm and said roll so that rotation of the latter will serve to move said lever into locking position in timed relation to the movement of said film, means actuated by said button for disconnecting said arm from said gear, and means operable upon said disengagement for moving said one end out of locking engagement with said knob.

8. In a roll film camera, the combination with a take-up spool positioned in one end of said camera, a winding knob operatively connected to said spool to rotate the latter to wind film thereon, a ratchet on said knob, a shutter-trigger release button on said camera, of a measuring roll engaged by said film and rotated by the movement thereof through the camera, a lever pivoted on said camera, a pawl formed on one end of said lever, a gear mounted on said camera, means for connecting said gear to said roll so that rotation of the latter will also rotate said gear, an arm pivoted on said camera and having the free end thereof arranged to engage a face of said gear, a laterally extending pin on said gear arranged to engage said free end to operatively connect said arm to said roll, said arm being movable upon said engagement to contact the other end of said lever to pivot the latter to bring said pawl into engagement with said ratchet to arrest further movement of said knob, a slidable member mounted on said camera and having a portion thereof engageable by said button so that said slidable member will be moved in one direction when said button is moved to operate said shutter, means on said slidable member for automatically disconnecting said arm from said pin when said slidable member is moved in said one direction, means for disengaging said pawl from said ratchet upon disengagement of said arm from said pin, and means for moving said slidable member in the opposite direction upon release of said button.

9. In a roll film camera, the combination with a take-up spool positioned in one end of said camera, a winding knob operatively connected to said spool to rotate the latter to wind film thereon, a ratchet on said knob, a shutter-trigger release button on said camera, of a measuring roll engaged by said film and rotated by the movement thereof through the camera, a lever pivoted on said camera, a pawl formed on one end of said lever, a gear mounted on said camera, a disengageable clutch for connecting said gear to said measuring roll, a flexible arm pivotally mounted on said camera and having the free end thereof arranged to ride on a face of said gear, a pin projecting laterally from said gear, the free end of said arm being formed with an opening adapted to receive said pin to operatively connect said arm to said roll, said pin serving to move said arm to bring the latter into engagement with the other end of said lever to pivot the latter to move said pawl into engagement with said ratchet to arrest rotation of said spool, a member slidably mounted on said camera, a cam on one end of said lever, a cooperating cam on said button arranged to engage the cam on said slidable member to slide the latter in one direction when the button is moved to shutter operating position, means on the other end of said slidable member arranged to engage said arm when said member is slid in said one direction to move said pin out of said opening to disconnect said arm from said roll, means for simultaneously moving said opening out of registry with said pin and for moving said pawl out of engagement with said ratchet when said slidable member is moved in said one direction, means for moving said slidable member in the opposite direction when said button is released, and a blocking member comprising a lug formed on said arm and arranged to engage said slide to prevent movement thereof until said arm is moved by said pin but when the arm is so moved the lug being moved out of blocking position to permit operation of said button.

10. In a roll film camera, the combination with a take-up spool positioned in one end of said camera, a winding knob operatively connected to said spool to rotate the latter to wind film thereon, a shutter-trigger release button mounted on said camera, of a measuring roll actuated by the movement of the film and independently of said knob, means controlled by said measuring roll for engaging and locking said knob after a predetermined length of film has been wound on said spool, a clutch member for operatively connecting said means to said roll so that the latter may control said means in timed relation to the movement of the film through the camera, means for connecting said button to said means for automatically moving the latter to disengage said knob when said button is pressed to operate said shutter, cooperating portions on said means for preventing operation of said button until said knob is locked, and manual control means for disengaging said clutch to render said means and said portions inoperative when said film is initially threaded through said camera.

HENRY O. DROTNING.
EDWARD KOSZALKA, Jr.

CERTIFICATE OF CORRECTION.

Patent No. 2,227,964. January 7, 1941.

HENRY O. DROTNING, ET AL.

It is hereby certified that error appears in the printed specification of the above numbered patent requiring correction as follows: Page 4, second column, line 66, claim 6, for the word "bottom" read --button--; and that the said Letters Patent should be read with this correction therein that the same may conform to the record of the case in the Patent Office.

Signed and sealed this 18th day of March, A. D. 1941.

(Seal)

Henry Van Arsdale,
Acting Commissioner of Patents.